March 22, 1932.  A. JANER  1,850,934

CONTAINER FOR LIP STICKS AND THE LIKE

Filed Oct. 10, 1928

Inventor

Andre Janer

By S. Clay Lindsay.

Attorney

Patented Mar. 22, 1932                        1,850,934

UNITED STATES PATENT OFFICE

ANDRE JANER, OF FLUSHING, NEW YORK

CONTAINER FOR LIP-STICKS AND THE LIKE

Application filed October 10, 1928. Serial No. 311,489.

This invention relates to devices for holding sticks of a material that is adapted to be worn away when used, such, for example, as lip-sticks and the like. The aim of the present invention is to provide a container of this sort having various features of novelty and advantage and which is particularly characterized by its simplicity in construction, by its convenience in use, and by the fact that it is sanitary.

More particularly, an aim of the invention is to provide an improved lipstick container in which provision is made for readily projecting the stick from or retracting the same into the casing at will and conveniently adjusting the stick within the container.

Provision is also made for automatically holding the stick in any desired position within the container while the stick is being applied. The means for moving the stick relative to the container also constitutes an ornament which gives to the article a pleasing appearance and adds to its salability.

A further aim of the invention is to provide an improved article of this sort wherein the various parts may be easily and cheaply assembled and wherein the assembled parts are effectively held in proper relation to one another.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, two embodiments which the present invention may take:

Figure 1:
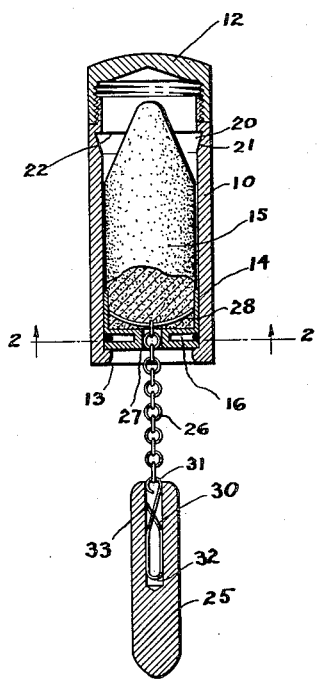
Figure 1 is a longitudinal sectional view through a container constructed in accordance with one embodiment of the invention.
Figure 2:
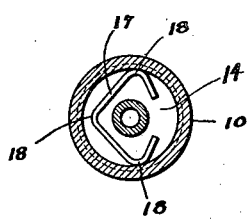
Fig. 2 is a transverse sectional view therethrough taken substantially on line 2—2 of Fig. 1.

Referring to the drawings in detail, 10 designates a casing which, of course, may be of any desired shape and which may be formed of any suitable material such, for example, as casein. In the present illustrative disclosure, the casing is shown as being of generally cylindrical form and open at each of its ends. One end of the casing is of reduced diameter and is provided with an external thread 11 which is adapted to cooperate with a complementary thread provided on a cap 12. In the embodiment shown in Figs. 1 to 3, the casing has, at its lower end, an internal flange 13. Slidably mounted within the casing 10 is a follower or stick carrier which, in the present instance, is in the form of a cup 14 which is adapted to receive the lower end of the lip, or other cosmetic stick, designated by the numeral 15. This cup is adapted to be inserted into the casing through the upper end thereof and is held against being withdrawn from the lower end of the casing by the flange 13. The bottom wall of the cup 14 is provided with a circumferential groove 16 which is adapted to receive a spring 17 which serves the purpose of holding the cup and the lipstick carried thereby in any desired position of adjustment. This spring is preferably formed from a length of resilient wire which is bent so as to form three angles 18, two of which angles are generally opposite each other and are adapted to bear against the internal wall of the casing 10. The third or central bend is employed to urge the two arms of the spring outwardly and against the wall of the casing. This spring is of sufficient force so that it will exert enough friction against the wall of the casing to hold the stick in position while it is being used.

For the purpose of preventing the cup and the stick carried thereby from being pushed upwardly out of the casing 10, the latter is provided, adjacent its upper end, with an internal groove 20, the circumferential wall 21 of which is preferably tapered upwardly and outwardly. The upper wall of this groove forms an abrupt shoulder 22. With this arrangement, to insert the cup into the casing, the spring 17 is compressed so that the arms thereof will enter the mouth of the casing and then the cup is forced inwardly. When the spring reaches the groove 20, the arms thereof spring outwardly but, due to the inclination or taper of the wall 21 of the groove, the cup may be further forced into the casing. However, due to the abrupt shoulder 22, the cup cannot again be forced out of the casing.

Heretofore, it has been necessary, in order to project the stick the desired distance from the casing, to insert the finger through the opening in the lower end of the casing and press against the follower or cup, an operation which was not always easy to carry out. After the stick had been used, the user would push the cosmetic back into the casing by engaging her fingers on the cosmetic which operation, of course, is very objectionable as it is unsanitary, it mars the end of the stick which is to be used, and it soils the fingers. In accordance with the present invention, provision is made by means of which the cosmetic may be very quickly and easily pushed up to the desired extent preliminary to using the same and then, after it has been used, may be pulled back without any inconvenience or meeting any of the objections above noted incident to containers as heretofore made and sold. To this end, there is connected to the cup, as by means of a chain or other flexible member, a pendant of the desired diameter and length. In the present illustrative disclosure, the pendant 25 is connected to the cup by means of a chain 26.

Figure 3:
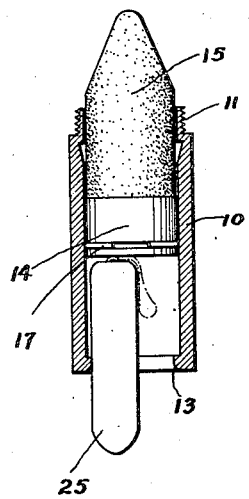
Fig. 3 is a view showing the casing in longitudinal section and the remaining parts in side elevation.

The chain may be anchored to the cup by passing one end of the chain through an opening 27 in the bottom thereof and passing a pin 28 transversely through the end link. With this arrangement, it will be observed that, when it is desired to use the lipstick or other cosmetic, the cap 12 is unscrewed from place and then one end of the pendant is brought to bear against the bottom of the cup, as shown in Fig. 3, and, by pushing on the pendant, the cup will move upwardly carrying the cosmetic to the desired position. While the cosmetic is being applied, the spring 17 will hold the same in adjusted position. After the cosmetic has been used, it may be withdrawn into the casing by merely pulling downwardly on the pendant. There is thus no necessity of the user engaging her fingers with the cosmetic for the purpose of pushing the same back into the casing so that unsanitary conditions and soiling of the fingers are avoided. The pendant being relatively long and narrow may be easily inserted into the opening in the bottom of the casing and the cup may be advanced as the cosmetic is worn away to its uppermost position in the casing. It may further be observed that, with this arrangement, since means are provided for readily projecting and retarding the cosmetic, the cosmetic may originally be of such length as to fill the casing above the cup, and the cap may be relatively short, which means that a very compact and small device is possible, making it very convenient to be carried about in a small pocketbook or the like. The pendant, in addition to being useful as just described, serves as an ornament, giving to the container a pleasing appearance.

Furthermore, in accordance with the present invention, the pendant is secured to the chain in a novel, effective and economical manner without the connection being seen or in any way marring the appearance of the pendant. To this end, there is provided, on the end of the chain, an anchor 30 formed of spring wire which is bent into the form of an elongated loop, the arms of which cross. One end of the spring has an eye or hook 31 threaded through the bottom-most link of the chain 26. The anchor is adapted to be engaged in a bore or recess 32 in the pendant, the diameter of this recess being such that, when the anchor is forced thereinto, the loop is reduced in width. The other end 33 of the wire from which the anchor is formed is disposed at an angle to, and is adapted to engage, the wall of the bore 32. With this arrangement, it will be observed that, to secure the chain to the pendant, it is merely necessary to insert the looped end of the anchor into the recess 32 and push the anchor home to the position shown in Fig. 1. The anchor may thus be pushed home as the end 33 will ride along the surface of the recess 32 without biting thereinto. However, the anchor cannot be pulled out of place because, if this is attempted, the end 33 will bite into the wall of the recess 32 and the harder the pull between the anchor and the pendant, the greater will be the bite. This arrangement is a very simple one, and the connection may be very cheaply and effectively made. Also, the use of rivets or the like, which would mar the appearance of the pendant, is avoided.

Figure 4:
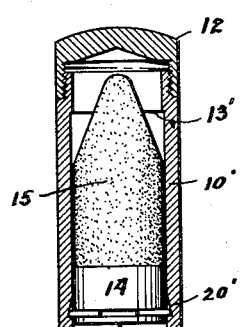
Fig. 4 is a view similar to Fig. 1, but showing another embodiment of the invention.

The container shown in Fig. 4 is generally similar to that illustrated in the preceding embodiment. However, in the embodiment shown in Fig. 4, the cup 14 and the stick 15 are adapted to be inserted through the bottom or uncapped end of the casing 10′. The casing 10′ has, adjacent its upper end, an internal shoulder 13′ for preventing the cup from being pushed from the capped end of the casing. Adjacent the bottom end of the casing 10′ there is an internal groove 20′ similar to the groove 20 of the preceding embodiment and serving a like purpose.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A lip-stick container comprising a casing, a stick carrier slidably mounted in the casing and insertible therein through one end of the casing, the casing having at said end a circumferential groove with an abrupt stop shoulder facing inwardly from the open end of the casing and with a circumferential wall tapering inwardly from said stop shoulder, and a spring mounted on the carrier in position to project outwardly therefrom and engage the internal wall of said casing and against said shoulder.

2. A lip-stick container comprising a casing open at opposite ends and provided with a removable cap on one end, a carrier slidably mounted in the casing and adapted to carry a lip-stick, a spring mounted on the carrier bearing against the inner wall of said casing, said casing provided near its capped end with an internal shoulder facing toward the opposite end of the casing and with an inclined wall leading from the shoulder, said spring on the carrier adapted to expand against said shoulder and lock the carrier against ejection from the casing when the cap is removed and said inclined wall adapted to compress the spring and admit of the retraction of the carrier, and operating means connected to the carrier and operative through the free open end of the casing.

3. A lip-stick container comprising a casing open at opposite ends, a cap removably mounted on one end of the casing, said casing having an internal groove near the cap supporting end thereof with one wall of the groove facing inwardly toward the opposite end of the casing to provide a stop shoulder and the other wall of the groove inclined inwardly from the base of the stop shoulder, a lip-stick carrier slidably mounted in the casing and having an annular groove in its outer surface, a spring mounted in said groove adapted for normal expansion against the inner wall of the casing to frictionally hold the carrier in adjusted position and adapted to expand against said inclined wall of the groove and abut said stop shoulder to limit the outward projection of the carrier, and a pendant connected to the inner end of the carrier and suspended through the opposite end of the casing for withdrawing the carrier in the casing and projecting the carrier toward the cap receiving end of the casing.

ANDRE JANER.